US012190691B2

(12) United States Patent
Neumann et al.

(10) Patent No.: US 12,190,691 B2
(45) Date of Patent: Jan. 7, 2025

(54) METHOD FOR DETERMINING A NOTEWORTHY SUB-SEQUENCE OF A MONITORING IMAGE SEQUENCE

(71) Applicant: Robert Bosch GmbH, Stuttgart (DE)

(72) Inventors: Christian Neumann, Hildesheim (DE); Christian Stresing, Berlin (DE); Gregor Blott, Salzgitter (DE); Masato Takami, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 161 days.

(21) Appl. No.: 17/915,668

(22) PCT Filed: Jun. 21, 2021

(86) PCT No.: PCT/EP2021/066765
§ 371 (c)(1),
(2) Date: Sep. 29, 2022

(87) PCT Pub. No.: WO2022/017702
PCT Pub. Date: Jan. 27, 2022

(65) Prior Publication Data
US 2023/0114524 A1 Apr. 13, 2023

(30) Foreign Application Priority Data
Jul. 20, 2020 (DE) ..................... 10 2020 209 025.4

(51) Int. Cl.
*G08B 13/196* (2006.01)
*G08B 13/16* (2006.01)
*G08B 29/18* (2006.01)

(52) U.S. Cl.
CPC ... *G08B 13/19613* (2013.01); *G08B 13/1672* (2013.01); *G08B 13/19669* (2013.01); *G08B 29/186* (2013.01)

(58) Field of Classification Search
CPC .......... G08B 13/19613; G08B 13/1672; G08B 13/19669; G08B 29/186; G08B 13/19647; G08B 29/188
(Continued)

(56) References Cited

U.S. PATENT DOCUMENTS 10,997,423 B1 * 5/2021 Borras .................. G06V 20/41
11,176,484 B1 * 11/2021 Dorner ................. G06F 16/738
(Continued)

FOREIGN PATENT DOCUMENTS

CA 2656268 A1 2/2008
WO 2008016360 A1 2/2008

OTHER PUBLICATIONS

International Search Report for PCT/EP2021/066765, Issued Sep. 30, 2021.

*Primary Examiner* — Thai Q Tran
*Assistant Examiner* — Stephen R Smith
(74) *Attorney, Agent, or Firm* — NORTON ROSE FULBRIGHT US LLP; Gerard A. Messina

(57) ABSTRACT

A method for determining a noteworthy sub-sequence of a monitoring image sequence of a monitoring area. The method includes: providing an audio signal from the monitoring area, at least partially including a time period of the monitoring image sequence; providing the monitoring image sequence of the environment to be monitored, which has been generated by an imaging system; determining at least one segment of the audio signal from the provided audio signal, which has unusual noises; determining at least one segment of the monitoring image sequence having unusual movements within the environment to be monitored; determining a correlation between the at least one segment of the audio signal having unusual noises and the at least one segment of the monitoring image sequence with
(Continued)

unusual movements in order to determine a noteworthy sub-sequence of the monitoring image sequence.

14 Claims, 1 Drawing Sheet

(58) Field of Classification Search
USPC ........................... 386/224; 348/143; 340/541
See application file for complete search history.

(56) References Cited

U.S. PATENT DOCUMENTS

| | | | | |
|---|---|---|---|---|
| 11,188,795 | B1 * | 11/2021 | Lee | G06F 18/217 |
| 2008/0309761 | A1 * | 12/2008 | Kienzle | G08B 13/194 348/143 |
| 2010/0153390 | A1 | 6/2010 | Angell et al. | |
| 2018/0220189 | A1 * | 8/2018 | Hodge | G06F 16/7837 |
| 2019/0152492 | A1 * | 5/2019 | el Kaliouby | G08G 1/096716 |
| 2019/0197354 | A1 | 6/2019 | Law et al. | |
| 2020/0126191 | A1 * | 4/2020 | Munkberg | G06T 5/70 |
| 2020/0394428 | A1 | 12/2020 | Turcot et al. | |
| 2021/0334592 | A1 * | 10/2021 | Taniai | G06T 7/593 |
| 2021/0350139 | A1 * | 11/2021 | Pardeshi | G06N 3/08 |
| 2023/0088660 | A1 * | 3/2023 | Dvir | H04N 7/183 348/143 |

* cited by examiner

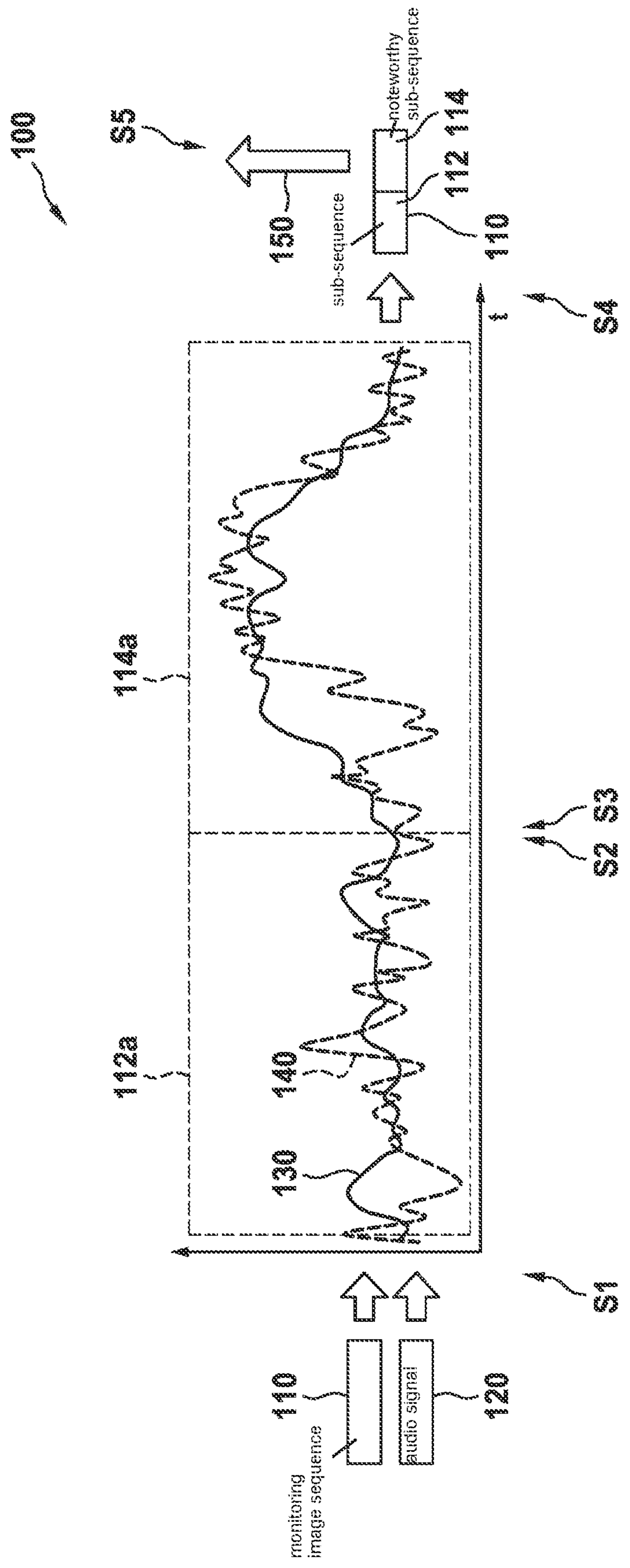
100
S5
150
noteworthy sub-sequence
114
112
110
sub-sequence
S4
t
114a
112a
140
130
S3
S2
S1
110
monitoring image sequence
audio signal
120

METHOD FOR DETERMINING A NOTEWORTHY SUB-SEQUENCE OF A MONITORING IMAGE SEQUENCE

BACKGROUND INFORMATION

Video-based vehicle interior monitoring is used to observe passengers in vehicles, e.g., in a ride-sharing vehicle or in an autonomous taxi or generally in at least partially automated driving, in order to record unusual occurrences during the trip. Uploading this video data via the cellular network, and a size of a data memory that has to be available on a device to store the video data, is an economically significant factor for the operating costs. To improve the economic efficiency of uploading and storing the videos, compression methods can be used to reduce the amount of data to be uploaded.

SUMMARY

In particular for uploading and storing such video files, for example in a cloud, a further reduction of the data to be uploaded in addition to compression may be required for economic reasons, without thereby impermissibly reducing a necessary quality in areas of relevant information.

This video-based vehicle interior monitoring can in particular be used in the field of car sharing, ride hailing or for taxi companies, for example to avoid dangerous or criminal acts or automatically or manually identify said acts.

To identify only a relevant part of a trip, for example in the vehicle, prior to uploading, so as to reduce the amount of data to be uploaded, methods would traditionally be used that treat such occurrences or events as a positive class. Such methods would be configured in such a way that the respective event is detected and classified in terms of time. To make this possible, the events would have to be clearly defined or definable.

A disadvantage of using such an in-depth analysis method in the vehicle to determine relevant occurrences or events or scenes is the associated computationally intensive effort, and consequently the cost. The development of such an in-depth analysis method also requires a great deal of effort to record relevant occurrences in sufficient quantity to be able to clearly and unambiguously define them. Besides, carrying out such calculations in a vehicle is very expensive in terms of hardware. In addition to this, there is a "chicken-and-egg problem", because a lot of data is needed from the field to be able to define the appropriate hardware and methods, but the hardware and methods have to be available before they can be used in the field.

According to aspects of the present invention, a method for determining a noteworthy sub-sequence of a monitoring image sequence, a method for training a neural network to determine characteristic points, a monitoring device, a method for providing a control signal, a monitoring device, a use of a method for determining a noteworthy sub-sequence of a monitoring image sequence and a computer program are provided. Advantageous configurations of the present invention are disclosed herein.

Throughout this description of the present invention, the sequence of method steps is presented in such a way that the method is easy to follow. However, those skilled in the art will recognize that many of the method steps can also be carried out in a different order and lead to the same or a corresponding result. In this respect, the order of the method steps can be changed accordingly. Some features are numbered to improve readability or to make the assignment more clear, but this does not imply a presence of specific features.

According to one aspect of the present invention, a method for determining a noteworthy sub-sequence of a monitoring image sequence of a monitoring area is provided. According to an example embodiment of the present invention, the method includes the following steps:

In one step, an audio signal from the monitoring area, which at least partially includes a time period of the monitoring image sequence, is provided. In a further step, the monitoring image sequence of the environment to be monitored, which has been generated by an imaging system, is provided. In a further step, at least one segment of the audio signal having unusual noises is determined from the provided audio signal.

In a further step, at least one segment of the monitoring image sequence having unusual movements within the environment to be monitored is determined.

In a further step, a correlation between the at least one segment of the audio signal having unusual noises and the at least one segment of the monitoring image sequence having unusual movements is determined in order to determine a noteworthy sub-sequence of the monitoring image sequence.

By determining noteworthy sub-sequences of the monitoring image sequence with this method, an upload of these noteworthy sub-sequences can suffice to adequately monitor the monitoring area. Since it can be assumed that noteworthy sub-sequences constitute only a small portion of the monitoring image sequence, this method can significantly reduce the amount of data that is stored and/or uploaded wirelessly to a control center and/or to an evaluation unit, for example. This achieves the goal of minimizing the costs of data transfer and storage.

The monitoring image sequence can comprise a plurality of sub-sequences, which each characterize a temporal subrange of the monitoring image sequence.

The monitoring area characterizes a spatial area in which changes are tracked via the audio signals and the monitoring image sequence.

When the monitoring area includes the interior of a vehicle, unusual noises and unusual movements in particular correspond to an interaction between a passenger and a driver of a vehicle. In particular, at least one segment of the monitoring image sequence having unusual movements of at least one object in the monitoring area is determined.

With this method, the monitoring area is monitored with both image signals of the monitoring image sequence and audio signals, whereby the audio signal can be provided together with the video signal, for example, in particular from a video camera, and the method analyzes both the image and the audio signals.

For the audio range, the frequency range can be divided in such a way that non-relevant portions are filtered. This applies to engine noise, for example, and very muffled noises from the environment outside the monitoring area. For the audio signal, it is in particular possible to use filter banks that are used in information technology and are suited and configured to separate ambient noise from passenger noise.

The audio signal can comprise a plurality of individually detected audio signals, which were each detected by individual different sound transducers in the monitoring area.

For the video analysis, i.e., the determination of unusual movements, for example of objects or passengers, the intent is to capture movements in the sequence of images of the monitoring image sequence. This is based on the assumption that there is little movement in the vehicle if there is no interaction between the driver and the occupant or passenger, such as in a situation without conflict.

The correlation between the at least one segment of the audio signal having unusual noises and the at least one segment of the monitoring image sequence having unusual movements can be determined both on the basis of rules and, as will be shown later, using appropriately trained neural networks.

In the simplest case, it is a matter of identifying scenes during the trip in which there was no talking and only little movement. Such sub-sequences of the monitoring image sequence can then be suppressed in terms of uploading due to lack of relevance.

According to one aspect of the present invention, it is provided that the monitoring area be a vehicle interior. In addition to the application for monitoring vehicle interiors, the here-described method for determining a noteworthy sub-sequence of a monitoring image sequence of a monitoring area can also be used generally for monitoring cameras or dash cams.

According to one aspect of the present invention, it is provided that the segment of the audio signal that comprises unusual noises and/or the segment of the monitoring image sequence having unusual movements be determined using a neural network trained to make such a determination.

In other words, in particular for the purpose of pre-filtering by means of a combined neural network, the audio signals and video signals of the monitoring image sequence can determine at least one segment of the audio signal that comprises unusual noises and/or determine segments of the monitoring image sequence that comprise unusual movement and/or separate ambient noise from passenger noise.

Generally, in neural networks, a signal at a connection of artificial neurons can be a real number, and the output of an artificial neuron is calculated by a nonlinear function of the sum of its inputs. The connections of the artificial neurons typically have a weight that adjusts as learning progresses. The weight increases or reduces the strength of the signal at a connection. Artificial neurons can have a threshold so that a signal is output only when the total signal exceeds that threshold.

A plurality of artificial neurons is typically grouped in layers. Different layers may carry out different types of transformations for their inputs. Signals travel from the first layer, the input layer, to the last layer, the output layer; possibly after traversing the layers multiple times.

The architecture of such an artificial neural network can be a neural network that, if necessary, is expanded with further, differently structured layers. Such neural networks basically include at least three layers of neurons: an input layer, an intermediate layer (hidden layer) and an output layer. That means that all of the neurons of the network are divided into layers.

In feed-forward networks, no connections to previous layers are implemented. With the exception of the input layer, the different layers consist of neurons that are subject to a nonlinear activation function and can be connected to the neurons of the next layer. A deep neural network can comprise many such intermediate layers.

Such neural networks have to be trained for their specific task. Each neuron of the corresponding architecture of the neural network receives a random starting weight, for example. The input data is then entered into the network and each neuron can weigh the input signals with its weight and forwards the result to the neurons of the next layer. The overall result is then provided at the output layer. The magnitude of the error can be calculated, as well as the contribution each neuron made to that error, in order to then change the weight of each neuron in the direction that minimizes the error. This is followed by recursive runs, renewed measurements of the error and adjustment of the weights until an error criterion is met.

Such an error criterion can be the classification error on a test data set, such as labeled reference images, for example, or also a current value of a loss function, for example on a training data set. Alternatively or additionally, the error criterion can relate to a termination criterion as a step in which an overfitting would begin during training or the available time for training has expired.

According to an example embodiment of the present invention, for the method for determining a noteworthy sub-sequence of the monitoring image sequence, such a neural network can be implemented using a trained convolutional neural network, which, if necessary, can be structured in combination with fully connected neural networks, if necessary using traditional regularization and stabilization layers such as batch normalization and training drop-outs, using different activation functions such as Sigmoid and ReLU, etc.

The respective image of the monitoring image sequence is provided to the trained neural network in digital form as an input signal.

According to one aspect of the present invention, it is provided that the at least one noteworthy sub-sequence of the monitoring image sequence is determined by subtracting at least one sub-sequence from the monitoring image sequence in which an expression of the correlation between the at least one segment of the monitoring image sequence having unusual movements and the at least one segment of the audio signal having unusual noises below a limit value is determined.

In other words, in this aspect of the method of the present invention, the noteworthy sub-sequence of the monitoring image sequence is identified by determining unnoteworthy sub-sequences for which the correlation is below a limit value. Such a limit value can in particular be determined by determining unusual noises and/or an unusual movement with respect to an overall observation period or an overall trip with the corresponding correlation and determining the limit value for the correlation to determine the unnoteworthy sub-sequences or the noteworthy sub-sequences as a function of a temporal progression of the correlation. The limit value can in particular be determined by means of a calculation of the mean value over the temporal progression of the correlation. Alternatively or additionally, a first limit value for unusual noises and/or a second limit value for unusual movements can be determined. Such a calculation can be triggered by entering or exiting a vehicle and/or by a driver of the vehicle.

In this aspect of the method of the present invention, it is possible to use special non-computationally intensive methods to determine the unusual noises and/or unusual movements in order to keep hardware costs down and also to minimize the need for expensive training and validation data, since the objective in this aspect of the method is to identify sub-sequences of the monitoring image sequence in which no unusual movement or no unusual noise can be determined.

The correlation of the segments of the audio signals and the segments of the monitoring image sequences can be rule-based or learned.

Due to a partial lack of knowledge about an unusual noise and/or unusual movement, in this aspect of the method of the present invention, a limit value is advantageously conservatively selected, which ensures that no unusual noises and/or movement have occurred in the monitoring area below these limit values; the method for determining a noteworthy sub-sequence is thus, in a sense, reversed. In other words, instead of determining events or noteworthy sub-sequences, phases of the trip are determined in which definitely no unusual event has occurred. This approach makes it possible to avoid the abovementioned costs and problems, because the methods for analyzing unusual noises and/or unusual movement can be configured to be less in-depth.

This therefore solves a problem of determining relevant areas in sensor data in order to upload a reduced data stream that excludes non-relevant ranges. Because, instead of defining and classifying all possible unusual events in advance, an inverse logic is used to exclude "usual" cases in a sense.

This reduces the amount of data to be uploaded and lowers direct operating costs. This also results in the advantage that a later evaluation does not have to evaluate the entire time progression of a trip, but can focus on relevant areas. This saves operational manual labor time. The resulting uploaded or stored acoustic and video-related data can then be analyzed manually or automatically.

Overall, this aspect of the method of the present invention has the advantage of being able to determine, with little computing power, which part of a trip or a monitoring period of a monitoring area and the associated sub-sequence of the monitoring image sequence is of little relevance, i.e. not noteworthy, in order to reduce the amount of data to be uploaded, for example to a cloud.

An imaging system for this method can be a camera system and/or a video system and/or an infrared camera and/or a LiDAR system and/or a radar system and/or an ultrasound system and/or a thermal imaging camera system.

According to one aspect of the method of the present invention, it is provided that the at least one segment of the audio signal having unusual noises be determined by identifying frequency bands of human voices with respect to unusual amplitudes and/or unusual frequencies in the audio signals.

Human voices can consequently be filtered out of ambient noise included in the audio data in order to improve a signal-to-noise ratio and portions not relevant to the determination of unusual noises can be filtered. This includes engine noise, for example, and very muffled noises from the environment. Filter banks from information technology can be used to separate ambient noise from passenger noise.

According to one aspect of the present invention, it is provided that the provided audio signal is a difference signal between an audio signal detected directly in the monitoring area and an ambient noise and/or a noise source.

Interference noise caused by a radio or a navigation device can be filtered and separated from the corresponding mixed acoustic signal by directly tapping an audio signal from the radio and/or navigation device and subtracting it. The audio signal from the radio and/or navigation device can accordingly be picked up by an additional microphone in the vicinity of the respective loudspeakers.

According to one aspect of the method of the present invention, it is provided that a source location of the provided audio signal be detected and the unusual noises be determined on the basis of the source location.

Such a detection of the source location of the provided audio signal can be carried out via a distributed positioning of sound transducers or microphones in the monitoring area or vehicle interior and evaluating amplitudes and/or phases of the audio signals. Alternatively or additionally, such a detection of the location can be carried out using stereo sound transducers or stereo microphones by evaluating amplitude differences and/or transit time differences.

As explained, the filtered sounds inside the vehicle can be evaluated via the audio amplitude in order to determine unusual noises. This makes use of the characteristic that the microphone can be installed in a dash cam next to the rear view mirror, for example, so that the voice of the driver is captured significantly closer to the microphone than voices/noises from the radio or the navigation device. The same applies, with slight attenuation, for the passengers communicating with the driver whose ear is close to the microphone. During the conversation, their voice will be directed toward a driver, and thus also toward the microphone, so that the driver can hear the voices better than the ambient noise. Conversations with the driver can thus be distinguished from other voices, such as from a radio or a navigation device, via the amplitude. Other additional information can be obtained via a stereo microphone or any other microphone having more than one input. This allows the direction of the voice to be determined and assigned to individual seats in the vehicle within the monitoring area.

According to one aspect of the present invention, it is provided that images of the monitoring image sequence be compressed and unusual movements in the monitoring area be determined by means of the monitoring image sequence on the basis of a change in the amount of effort required to compress successive images of the monitoring image sequence.

The optical flow can also be approximated by the flow used in the H264/H265 codec. This describes movements of macroblocks between two successive images.

To determine movements in the images of the monitoring image sequence, it is also possible to determine difference images over time. This is advantageously associated with a particularly low computational effort.

A range of movements can thus advantageously be determined by determining the respective bit rate of compressed images. For large movements, the bit rates of the image go up, whereas images with little movement can be compressed significantly more.

The method of the present invention provided here can moreover be used with any coding method for compression, such as H.265, and does not have to rely on proprietary coding methods, for example from the video sector. Alternatively or additionally, a general coding method, such as MPEG, H.264, H.265, can be used.

According to one aspect of the method of the present invention, it is provided that the unusual movements be determined as a function of the change in compression in at least one image area of the images.

A compression of the images with formats such as H.264/H.265 is usually already available in the device. Reading out and processing this information requires only a small amount of computational effort. When accessing the compression rates of the individual macroblocks of the H.264/H.265 compression, the compression rates can even be extracted for individual areas of the image. This allows the compression rates that correlate with the movement to be assigned to specific areas of the vehicle.

By dividing the vehicle interior into different areas, the movement measurement can also be focused more strongly on relevant unusual movements in the vehicle.

By segmenting the monitoring area and in particular an interior view of a vehicle, e.g., using a neural network for semantic segmentation, the windows, empty seats, or also steering wheel areas can be removed from the images of the monitoring image sequence entirely or weighted down. This can also be achieved indirectly by suppressing movement in these areas, e.g. by blackening these areas or by strong blurring. It is also possible to apply different weightings to the absolute movement in different rows of seats.

These areas can be static or can be adjusted dynamically, e.g. if there is a person detection.

According to one aspect of the present invention, it is provided that, for determining unusual movement in the monitoring area, at least one optical flow of images of the monitoring image sequence be determined and unusual movements be determined using the images on the basis of the determined optical flow.

The determination of the optical flow can advantageously be implemented with little computational effort and movements in the images of the monitoring image sequence can therefore be determined over time in the same way as with a simple determination of difference images.

These video-based methods, which can be implemented with little computing power, can be compensated for non-relevant movements in the image. Such non-relevant movements are changes in the window areas, for example, or also movements related to driving. The following methods can be used for compensation:

According to one aspect of the present invention, it is provided that the monitoring area be located inside a vehicle and a movement of the vehicle and/or a current movement of the vehicle is determined by means of a map comparison and/or a steering wheel position and/or a subrange of the images comprising the optical flow and used to determine unusual movements on the basis of the optical flow of the images.

It is possible, for instance, to use an inertial measurement unit (IMU) to determine the larger movement in the windows when the vehicle negotiates a curve, in particular for a window in the rear and on the outside relative to the curve, and also the movement of the occupants resulting from the driving behavior. The inertial measurement unit (IMU) is used to detect whether a curve is currently being negotiated, for example, or whether hard braking has occurred. The same can be achieved using a global positioning system (GPS) in combination with map matching, whereby map matching also makes it possible to take into account movements of the driver before and at the beginning of the turning procedure, such as shoulder check or turning the steering wheel.

According to one aspect of the present invention, it is provided that characteristic points of persons in the monitoring area be determined, and unusual movements be determined on the basis of a change in the characteristic points within the monitoring image sequence.

Such characteristic points can be defined on the hands, arms or, for example, on the necks of persons, so that unusual movements, such as raising an arm beyond a certain height, can be tracked in order to determine unusual movements of the persons.

According to one aspect of the present invention, it is provided that the characteristic points of persons in the monitoring area be determined by means of a neural network trained to determine characteristic points.

The use of an appropriately configured and trained neural network makes the determination of characteristic points particularly easy, because only correspondingly labeled reference images have to be provided.

According to one aspect of the present invention, it is provided that the correlation be determined using a temporal correlation between the at least one segment of the audio signal having unusual noises and the at least one segment of the monitoring image sequence having unusual movements.

According to one aspect of the present invention, it is provided that the at least one noteworthy sub-sequence of the monitoring image sequence be determined using the fact that an expression of the correlation is above an absolute value and/or above a relative value that is based on a mean value of the correlation with respect to the entire monitoring image sequence.

The use of this is advantageous in particular when, for example, there is information that a conflict has occurred during the trip. With this information, then, it can be assumed that a specific part of the trip has more activity in terms of the audio signals or the monitoring image sequence of this trip than the rest of the trip. Using a relative value for the expression of the correlation determined for this trip, a decision threshold related the respective trip can be determined.

According to one aspect of the present invention, it is provided that the correlation between the at least one segment of the audio signal having unusual noises and the at least one segment of the monitoring image sequence having unusual movements be determined by means of a neural network trained to determine a correlation.

According to one aspect of the present invention, it is provided that the neural network trained to determine the correlation be configured to determine the at least one segment of the audio signal that comprises unusual noises and/or the at least one segment of the monitoring image sequence having unusual movements.

Thus, with an appropriately configured and trained neural network, it is possible to determine both the at least one segment of the audio signal that comprises unusual noises and the at least one segment of the monitoring image sequence that comprises unusual movements and also the determination of characteristic points of persons or passengers in the monitoring area.

According to an example embodiment of the present invention, a method is provided in which, based on a noteworthy sub-sequence of a monitoring image sequence of a monitoring area, a control signal for controlling an at least partially automated vehicle is provided, and/or, based on the noteworthy sub-sequence, a warning signal for warning a vehicle occupant is provided.

With respect to the feature that a control signal is provided based on a noteworthy sub-sequence of a monitoring image sequence of a monitoring area determined in accordance with one of the above-described methods, the term "based on" is to be understood broadly. It is to be understood such that the noteworthy sub-sequence is used for every determination or calculation of a control signal, whereby this does not exclude that other input variables are used for this determination of the control signal as well. The same applies correspondingly to the provision of a warning signal.

According to an example embodiment of the present invention, a method for training a neural network to determine characteristic points with a plurality of training cycles is provided, wherein each training cycle comprises the following steps:

In one step, a reference image is provided, wherein characteristic points of persons are labeled in the reference image. In a further step, the neural network is adapted to determine the characteristic points in order to minimize a deviation from the labeled characteristic points of the respective associated reference image when determining the characteristic points of the persons with the neural network.

The neural network for determining the characteristic points can in particular be a convolutional neural network.

With such a neural network, the characteristic points of a person can easily be identified by generating and providing a plurality of labeled reference images with which said neural network is trained to determine a noteworthy sub-sequence of a monitoring image sequence of a monitoring area.

Reference images are images that have in particular been acquired specifically for training a neural network and have been selected and annotated manually, for example, or have been generated synthetically and labeled for the respective purpose of training the neural network. Such labeling can in particular relate to characteristic points of persons in images of a monitoring image sequence.

According to an example embodiment of the present invention, a monitoring device is provided, which is configured to carry out any one of the above-described methods for determining a noteworthy sub-sequence of a monitoring image sequence of a monitoring area. With such a monitoring device, the corresponding method can easily be integrated into different systems.

According to an example embodiment of the present invention, a use of one of the above-described methods for monitoring a monitoring area is provided, wherein the monitoring image sequence is provided by means of an imaging system.

According to one aspect of the present invention, a computer program is specified which comprises instructions that, when the computer program is executed by a computer, prompt said computer program to carry out one of the above-described methods. Such a computer program enables the described method to be used in different systems.

According to an example embodiment of the present invention, a machine-readable storage medium is provided, on which the above-described computer program is stored. Such a machine-readable storage medium makes the above-described computer program portable.

Embodiment Examples

Embodiment examples of the present invention are shown with reference to FIG. 1 and will be explained in more detail in the following.

BRIEF DESCRIPTION OF THE DRAWINGS

FIG. 1 shows a schema of the method for determining a noteworthy sub-sequence of a monitoring image sequence, according to an example embodiment of the present invention.

DETAILED DESCRIPTION OF EXAMPLE EMBODIMENTS

FIG. 1 schematically outlines the method 100 for determining a noteworthy sub-sequence 114*a* of a monitoring image sequence 110 of a monitoring area.

The audio signal 120 and the monitoring image sequence 110 from the monitoring area is provided S1, wherein the monitoring image sequence 110 is generated by an imaging system.

The method 100 is used to determine at least one segment 114*a* of the audio signal 130 from the provided audio signal 130 S2 that comprises unusual noises, wherein the at least one segment 114*a* of the audio signal 130 having unusual noises is determined here by identifying frequency bands of human voices with respect to an unusually high amplitude.

The method is also used to determine movements 140, for example of objects, within the monitoring image sequence 110 and, by means of the movement 140, determine a segment 114*a* of the monitoring image sequence having unusual movements within the environment to be monitored S3.

As can be seen from FIG. 1, the audio signal 130 and the movement signal 140 in segment 114*a* correlate with one another and thus determine a noteworthy sub-sequence of the monitoring image sequence.

The segment of the audio signal that comprises unusual noises and/or the segment of the monitoring image sequence having unusual movements can be determined using a neural network trained to make such a determination.

Alternatively or additionally, the at least one noteworthy sub-sequence 114*a* of the monitoring image sequence 110 can be determined by subtracting at least one sub-sequence 112*a* from the monitoring image sequence 110 in which an expression of the correlation between the at least one segment 112*a* of the monitoring image sequence 110 having unusual movements and the at least one segment 112*a* of the audio signal 130 having unusual noises below a limit value is determined.

A plurality of noteworthy sub-sequences 114*a* can thus be determined in the monitoring image sequence 110 S4. Alternatively, a plurality of sub-sequences 112*a* in which the expression of the correlation is determined below a limit value, as described above, can be determined to determine the monitoring image sequence 110. Then, in a step S5, the plurality of sub-sequences 114 of the monitoring image sequence 110 determined to be noteworthy can be uploaded, for example wirelessly, from a vehicle to a cloud.

What is claimed is:

1. A method for determining a noteworthy sub-sequence of a monitoring image sequence of a monitoring area of a monitored environment that has been generated by an imaging system, comprising the following steps:

providing an audio signal from the monitoring area, which at least partially corresponds to a time period of the monitoring image sequence;

providing the monitoring image sequence;

determining at least one segment of the audio signal from the provided audio signal, which has unusual noises that have one or more audio characteristics predefined as being unusual;

determining at least one segment of the monitoring image sequence having, within the monitored environment, unusual movements that have one or more image characteristics predefined as being unusual; and determining a correlation between the at least one segment of the audio signal having the unusual noises and the at least one segment of the monitoring image sequence having the unusual movement to determine the noteworthy sub-sequence of the monitoring image sequence;

wherein the method includes at least one of the following two features (I)-(II):

(I) the at least one noteworthy sub-sequence of the monitoring image sequence is determined by subtracting from the monitoring image sequence at least one sub-sequence in which an expression of the correlation between the at least one segment of the monitoring image sequence having the unusual movements and the at least one segment of the audio signal having the unusual noises below a limit value is determined; and (II) the unusual movements in the monitoring area are determined based on a change in an amount of effort required to compress successive images of the monitoring image sequence.

2. The method according to claim 1, wherein the at least one noteworthy sub-sequence of the monitoring image sequence is determined by the subtracting from the monitoring image sequence the at least one sub-sequence in which the expression of the correlation between the at least one segment of the monitoring image sequence having the unusual movements and the at least one segment of the audio signal having the unusual noises below the limit value is determined.

3. The method according to claim 1, wherein the one or more audio characteristics include presence, in the audio signal, of frequency bands of human voices with amplitudes and/or frequencies that are predefined as unusual.

4. The method according to claim 1, wherein the one or more audio characteristics include a detected source location of the provided audio signal.

5. The method according to claim 1, wherein the unusual movements in the monitoring area are determined based on the change in the amount of effort required to compress the successive images of the monitoring image sequence.

6. The method according to claim 1, wherein the one or more image characteristics include a predefined characteristic of a determined optical flow of images of the monitoring image sequence.

7. The method according to claim 1, further comprising: determining characteristic points of persons in the monitoring area, wherein the one or more image characteristics include a predefined change in the characteristic points within the monitoring image sequence.

8. The method according to claim 7, wherein the characteristic points of persons in the monitoring area are determined using a neural network.

9. The method according to claim 8, further comprising: training the neural network to determine the characteristic points of persons in the monitoring area, with a plurality of training cycles, wherein each of the training cycles comprises the following steps:

providing a reference image in which characteristic points of persons are labeled; and adapting the neural network in order to minimize a deviation of the characteristic points in the reference image as determined by the neural network from the labeled characteristic points of the respective associated reference image.

10. The method according to claim 1, wherein the correlation between the at least one segment of the audio signal having the unusual noises and the at least one segment of the monitoring image sequence having the unusual movements is determined using a neural network trained to determine the correlation.

11. The method according to claim 10, wherein the neural network trained to determine the correlation is configured to determine the at least one segment of the audio signal that includes the unusual noises and/or the at least one segment of the monitoring image sequence having the unusual movements.

12. The method according to claim 1, wherein, based on the noteworthy sub-sequence of the monitoring image sequence of the monitoring area, a control signal for controlling an at least partially automated vehicle is provided, and/or, based on the noteworthy sub-sequence, a warning signal for warning a vehicle occupant is provided.

13. A monitoring device configured to determine a noteworthy sub-sequence of a monitoring image sequence of a monitoring area of a monitored environment that has been generated by an imaging system, the monitoring device configured to:

provide an audio signal from the monitoring area, which at least partially corresponds to a time period of the monitoring image sequence;

provide the monitoring image sequence;

determine at least one segment of the audio signal from the provided audio signal, which has unusual noises that have one or more audio characteristics predefined as being unusual;

determine at least one segment of the monitoring image sequence having, within the monitored environment, unusual movements that have one or more image characteristics predefined as being unusual; and determine a correlation between the at least one segment of the audio signal having the unusual noises and the at least one segment of the monitoring image sequence having the unusual movement to determine the noteworthy sub-sequence of the monitoring image sequence;

wherein the monitoring device is configured to at least one of:

(I) determine the at least one noteworthy sub-sequence of the monitoring image sequence by subtracting from the monitoring image sequence at least one sub-sequence in which an expression of the correlation between the at least one segment of the monitoring image sequence having the unusual movements and the at least one segment of the audio signal having the unusual noises below a limit value is determined; and (II) determine the unusual movements in the monitoring area based on a change in an amount of effort required to compress successive images of the monitoring image sequence.

14. A non-transitory computer-readable medium on which is stored a computer program including instructions for determining a noteworthy sub-sequence of a monitoring image sequence of a monitoring area of a monitored environment that has been generated by an imaging system, the instructions, when executed by a computer, causing the computer to perform the following steps:

providing an audio signal from the monitoring area, which at least partially corresponds to a time period of the monitoring image sequence;

providing the monitoring image sequence;

determining at least one segment of the audio signal from the provided audio signal, which has unusual noises that have one or more audio characteristics predefined as being unusual;

determining at least one segment of the monitoring image sequence having, within the monitored environment, unusual movements that have one or more image characteristics predefined as being unusual; and determining a correlation between the at least one segment of the audio signal having the unusual noises and the at least one segment of the monitoring image sequence having the unusual movement to determine the noteworthy sub-sequence of the monitoring image sequence;

wherein the non-transitory computer-readable medium includes at least one of the following two features (I)-(II):

(I) the at least one noteworthy sub-sequence of the monitoring image sequence is determined by subtracting from the monitoring image sequence at least one sub-sequence in which an expression of the correlation between the at least one segment of the monitoring image sequence having the unusual movements and the at least one segment of the audio signal having the unusual noises below a limit value is determined; and (II) the unusual movements in the monitoring area are determined based on a change in an amount of effort required to compress successive images of the monitoring image sequence.

* * * * *